(12) United States Patent
Rieger

(10) Patent No.: US 8,182,570 B2
(45) Date of Patent: May 22, 2012

(54) COMPACT AIR FILTER ELEMENT

(75) Inventor: Mario Rieger, Freiberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 512 days.

(21) Appl. No.: 12/304,693

(22) PCT Filed: Jun. 4, 2007

(86) PCT No.: PCT/EP2007/055433
§ 371 (c)(1),
(2), (4) Date: May 28, 2009

(87) PCT Pub. No.: WO2007/144279
PCT Pub. Date: Dec. 21, 2007

(65) Prior Publication Data
US 2010/0024371 A1  Feb. 4, 2010

(30) Foreign Application Priority Data
Jun. 16, 2006 (DE) .......................... 10 2006 028 159

(51) Int. Cl.
*B01D 46/00* (2006.01)
(52) U.S. Cl. ................. 55/502; 55/503; 55/520; 55/521
(58) Field of Classification Search .................... 55/502, 55/503, 520, 521
See application file for complete search history.

(56) References Cited

U.S. PATENT DOCUMENTS

| 5,902,364 A * | 5/1999 | Tokar et al. ..................... 55/498 |
| 6,610,126 B2 * | 8/2003 | Xu et al. ......................... 95/273 |
| 6,966,940 B2 * | 11/2005 | Krisko et al. ................... 55/497 |

FOREIGN PATENT DOCUMENTS
WO    WO 8803432 A1 *  5/1988

* cited by examiner

*Primary Examiner* — Robert Clemente
(74) *Attorney, Agent, or Firm* — James Hasselbeck

(57) ABSTRACT

In a compact air filter element (10) having a filter body (11) consisting of a coiled filter medium, through which filter body flow can pass through axially through its end sides (11.1), and which filter body (11) has at least one ring sealing element (15) extending along the periphery of the filter body (11), the filter body (11) is inserted into a hood element (12) and tightly seals to this. The hood element (12) covers one of the end sides (11.1) and grasps the outer periphery of the filter body (11) over the whole of the periphery in a grasping area close to the end side, wherein the grasping area of the hood element (12) ends in an outer edge having a ring edge surface (14.1) on or at which at least one ring sealing element (15) for placing against a sealing flange (22) of a housing pot element (20) is arranged. The reverse arrangement having the ring seal assigned to the housing pot element which presses on the hood element is also possible.

10 Claims, 2 Drawing Sheets

_COMPACT AIR FILTER ELEMENT_

TECHNICAL FIELD

The invention relates to an axial flow filter element and, more particularly, to an axial flow compact filter element including a filter member that is comprised of a coiled filter medium designed for axial flow passing through its end faces and including at least one annular sealing element that extends about the circumference of the filter member.

BACKGROUND OF THE INVENTION

Various types of spirally wound compact filter elements configured for axial flow and housings for these filter elements are known in the art. DE 32 49 151 C2 discloses a compact air filter element comprised of a corrugated filter paper and a flat filter paper. The filter papers are glued together and then wound together to form a filter element of the desired size. Gluing of the filter paper layers is realized by a strip-shaped applied in the edge areas of the filter paper. With this technique the interstices between the corrugated and the flat layers are closed alternatingly at the two end faces so that no direct flow is possible through the channels formed between the filter papers. Air flow, when flowing from the unfiltered air side to the filtered air side, first reaches only branch channel, then passes through the filter paper and flows out from a branch channel on the other side. In comparison to conventional folded filters, these compact air filters have the advantage that for the same size a larger filter surface area is provided or for the same filter surface area a smaller size is made possible.

In folded or pleated filters, servicing of a filter medium is partially done such that the filter insert element is removed from the housing and, by impacting the filter on a hard surface, the dust collected between the folds may be removed so that the service life of the filter insert element can be minimally increased even when only coarse particles are removed and the fine dust that is clogging the pores of the filter medium remain in place. It is also possible that the filter element can be unintentionally damaged should it impact another object while being exchanged. For an example, in case of a compact air filter element wound from paper layers a detachment of the inner adhesive beads may occur. The adhesive beads connect the corrugated layer and the flat cover layer and also close off the channels formed between the layers at the ends. This can result in direct air flow through the channels from the unfiltered side to the filtered side, which is highly undesirable. If this damaged compact air filter element is positioned upstream in an air intake of an internal combustion engine, this can cause severe motor damage.

In addition to detachment of the adhesive layer, impacting the filter element against a hard surface can tear the filter paper in a way that the tear then extends across the adhesive bead. In this case it is also possible that unfiltered air loaded with dirt can pass through the compact air filter element can cause damage.

SUMMARY OF THE INVENTION

It is an object of the present invention to improve a compact air filter element of the aforementioned kind such that it is better protected with respect to improper handling.

It is proposed to insert the filter member into a hood element and to connect it thereto and tightly sealed about the entire circumference by means of adhesives and/or sealing material. In this way, a unit is formed that is removable as a unit and is configured to be inserted into a cup-shaped housing element. Servicing is thus very simple: the flange connection between the compact air filter element and the cup-shaped housing element is released. The cup-shaped housing element remains on the vehicle or the machine. The filter member and hood element are removed from the housing element and exchanged as a single unit. Since seals are provided on the hood element, on the sealing flange of the cup-shaped housing element or on both, the new compact air filter element must only be inserted and then retightened.

In the compact air filter element according to the invention, an end face area of the filter member is particularly protected. This protected end face is preferably oriented toward the unfiltered air side of the filter element. The hood element that is formed in particular of plastic material provides protection from damage that may be caused by impact acting upon the edge area where the adhesive beads are located as well as providing protection against tears in the filter paper. Moreover, the hood element prevents bending, crushing and compressing of the filter member. Finally, in cases where the filter members are not impregnated, protection is also provided to keep the filter members from becoming wet and soiled. For example, the mechanic when servicing a construction machine can place the compact air filter element according to the invention on a machine or ground surface with the hood element facing down in order to have his hands free. The hood element may become soiled, however the hood element does not come into contact with the filtered air flow.

The differences between a first embodiment of the invention and a second embodiment resides in the interchanged arrangement of annular seal and flange surface against which the annular seal is pressed.

Also possible is an embodiment that realizes both configurations at the same time where on the cup-shaped housing element as well as on the hood element annular seals are inserted or integrally formed.

The integrally formed seal has the advantage that it is captively attached and cannot shift in position.

A cord packing inserted into a sealing groove can be formed in a simple way of known sealing profiles and can be exchanged when damaged. This is particularly advantageous when the annular seal is arranged on the fixedly mounted cup-shaped housing element that is not designed to be regularly exchanged.

Preferably, the grasping area of the hood element has an annular flange onto which the annular edge surface with the receiving groove for the annular sealing element is arranged and on which are provided rearwardly facing, at least sectionwise along the hood circumference, support surfaces for at least one latching element, respectively. By means of the flange-like widened edge area of the hood element several functions are thus fulfilled at the same time.

When the filter member is comprised at least of a layer of flat filter paper and a layer of corrugated filter paper that are connected to one another by means of adhesive beads that are applied in the edge areas of the filter paper and at the same time close off the channels that are formed between the papers, the grasping area of the hood element should extend at least so far away from the end face across the length of the filter member that the adhesive beads are covered. The hood element then forms in this critical area a hard protective shell.

Preferably, the compact air filter element according to the invention is used in connection with a cup-shaped housing element that at its open side is to be connected to the annular edge or the sealing flange of the hood element of the compact air filter element and into which is insertable a part of the filter member that is projecting from the hood element. The two main components thus form a filter housing and are matched to one another such that in particular a sealing action of the two housing halves relative to one another is ensured.

In order to pretension the seal in the flange area and to be able to fixedly connect the hood element with a suitable cup-shaped housing element, several latching elements are preferably provided on distributed about the circumference on the hood element.

Alternatively, or in addition, the hood element and the cup-shaped housing element may be connected to one another by engaging projections or recesses with snap hooks that lock therein.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
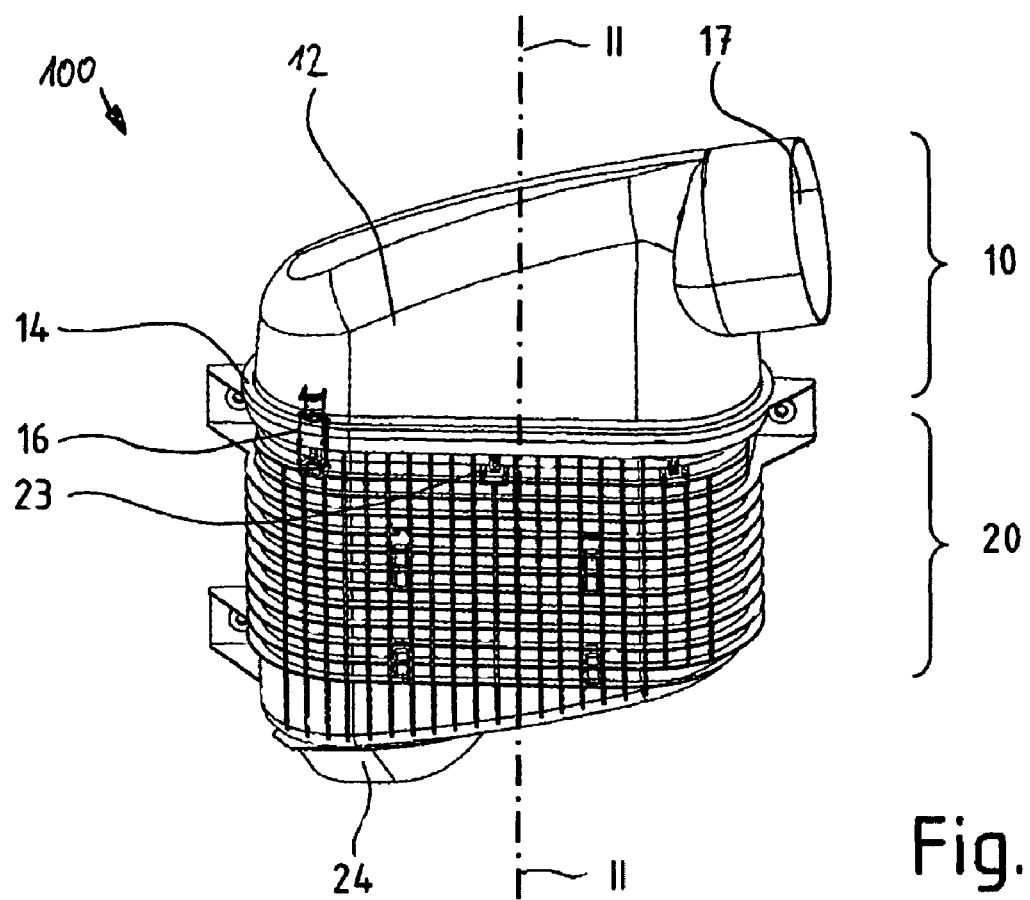
FIG. 1 is a perspective view of a compact air filter element in a filter unit, consistent with the present invention.

FIG. 1 provides a perspective illustration of a filter unit 100 that includes a cup-shaped housing element 20 configured to be mounted fixedly and a compact air filter element 10 that together with its hood element 12 forms part of the filter housing. Connecting sockets or fittings 17, 24 serve for connecting hoses or air ducts thereto.

The outer periphery edge of the hood element 12 is formed as an annular flange 14 configured for sealing relative to the cup-shaped housing element 20 and also forms a point of attack for the latching elements 16 that are distributed about the circumference of the flange with which the two housing parts 10, 20 of the filter unit 100 can be fixedly clamped together. For ease of illustration, in FIG. 1 only one latching element 16 is illustrated.

Figure 2:
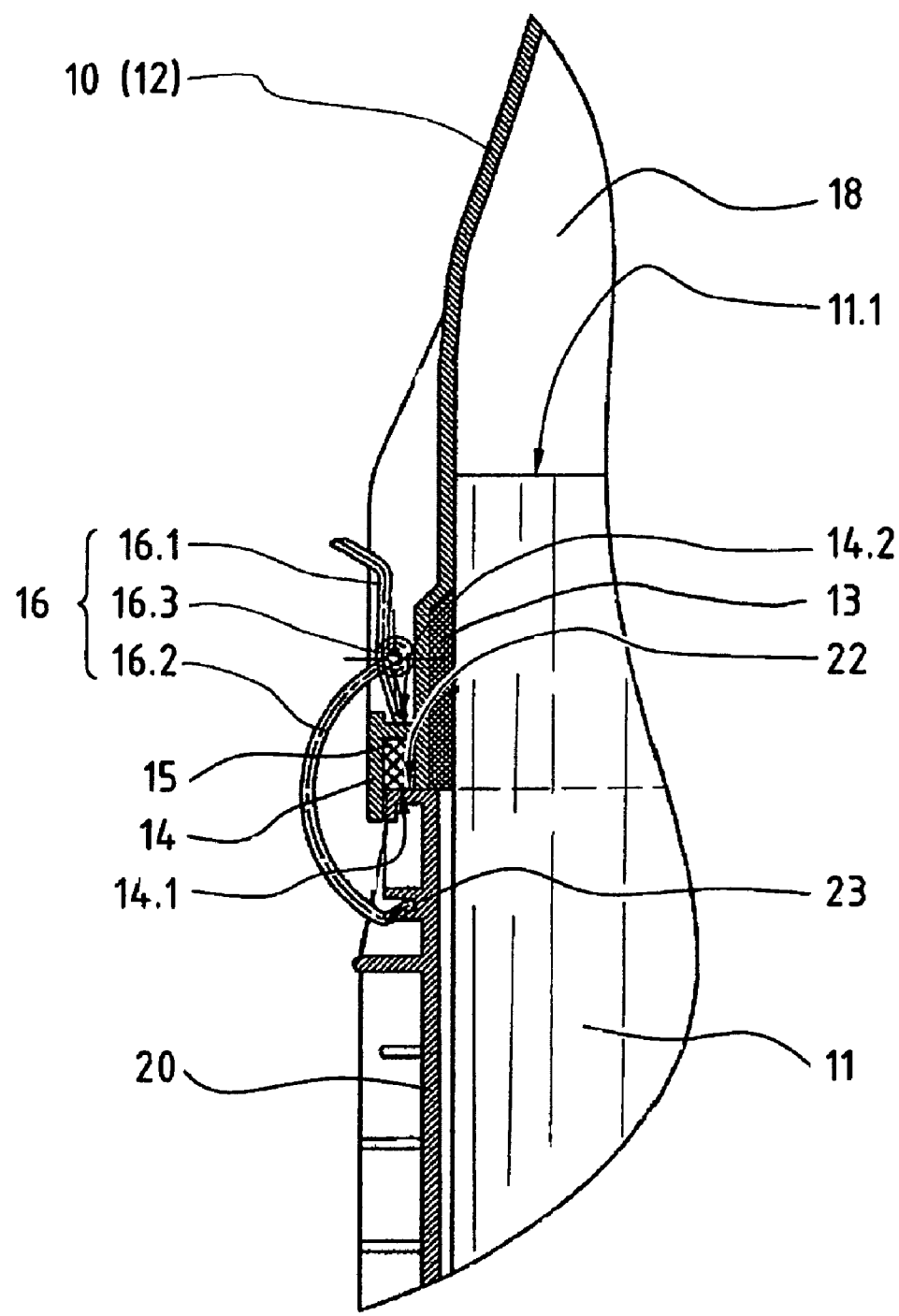
FIG. 2 illustrates a sectional view taken along line II-II in FIG. 1.

Important features of the compact air filter element 10 may be better understood from the sectional view illustrated in FIG. 2. FIG. 2 shows a detail of a section along the line II-II in FIG. 1 limited to the area of the annular flange 14.

The compact air filter element 10 is comprised of a hollow hood element 12 and a filter member 11. A flexible sealing and adhesive layer 13 connects the two parts in a tightly sealed and non-detachable manner. In this connection, the hood element 12 surrounds the filter member 11 only in the area near one end face 11.1. The area of the hood element 12 above the end face 11.1 is not filled out. A cavity 18 enables a uniform distribution of the unfiltered air entering through the connecting socket 17 onto the end face 11.1 of the filter body 11.

The filter member 11 projects downwardly with a predominant part of its length from the hood element 12. This part is surrounded in the completed filter unit 100 by the cup-shaped housing part 20.

On its outer edge the hood element 12 is expanded by an annular flange 14 that surrounds a groove for receiving an annular seal 15. Moreover, a rearward side of the annular flange 14 that is facing away from the cup-shaped element 20 serves as a support surface 14.2 for a latching element 16 that can be supported thereon by means of a latching lever 16.1. The latching lever 16.1 is connected through a joint 16.3 to a latching bracket 16.2 that is locked in a latching receptacle 23 on the cup-shaped housing part 20.

By actuating the latch 16 the compact air filter element 10 with its annular edge surface 14.1, past which the annular sealing element 15 projects as long as the latch 16 is not yet pretensioned, is pressed against a sealing flange 22 at the upper edge of the cup-shaped housing part 20. When doing so, the annular sealing element 15 is compressed, forming a seal-tight connection.

While the best modes for carrying out the invention have been described in detail, those familiar with the art to which this invention relates will recognize various alternative designs and embodiments for practicing the invention within the scope of the appended claims.

The invention claimed is:

1. A compact air filter element (10) comprising
a filter member (11) having a coiled filter medium in which said filter member is designed for axial flow passing through its end faces (11.1) and includes at least one annular sealing element (15) that extends substantially about a circumference of said filter member (11),
characterized in that
said filter member (11) is inserted into a hood element (12),
wherein a flexible sealing and adhesive layer connects said filter member (11) to said hood element (12) in a tightly sealed and non-detachable manner,
wherein said hood element covers one of said end faces (11.1) and surrounds completely said outer circumference of said filter member (11) in an grasping area near said end face, and
wherein said grasping area of said hood element (12) ends in an outer edge with an annular edge surface (14.1) on which or at which is provided at least one annular sealing element (15) for contacting a sealing flange (22) of a cup-shaped housing element (20) is arranged.

2. A compact air filter element comprising
a filter member having a coiled filter medium in which said filter member is designed for axial flow passing through its end faces and includes at least one annular sealing element that extends about said circumference of said filter member,
characterized in that
said filter member is inserted into a hood element,
wherein a flexible sealing and adhesive layer connects said filter member (11) to said hood element (12) in a tightly sealed and non-detachable manner,
wherein said hood element covers one of said end faces and surrounds completely said outer circumference of said filter member in an grasping area near said end face,
wherein said grasping area of said hood element ends in an outer edge with a sealing flange for contacting an annular edge of a cup-shaped housing element on which at least one annular sealing element is arranged.

3. The compact air filter element according to claim 1 or 2, wherein
said annular sealing element is integrally formed on said annular edge surface.

4. The compact air filter element (10) according to claim 1 or 2, wherein
said annular sealing element (15) comprises a cord packing.

5. The compact air filter element (10) according to claim 3, further comprising
a plurality of latching elements (16) distributed about said circumference on said hood element (12).

6. The compact air filter element (10) according to claim 5, wherein said grasping area of said hood element (12) has an annular flange (14) on which said annular edge surface (14.1) provided with a receiving groove for said annular sealing element (15) is arranged and on which rearwardly facing, at least over sections thereof, support surfaces (14.2) for at least one latching element (16), respectively, are provided.

7. The compact air filter element (10) according to claim 6, wherein said filter member (11) further comprises at least one layer of flat filter paper and at least one layer of corrugated filter paper that are connected by adhesive beads that are applied to edge areas of said filter papers and, at said same time, close off channels formed between said papers at said ends, and in which said grasping area of said hood element (12) extends at least so far across a length of said filter member (11), when viewed from said end face (11.1), that said adhesive bead is covered.

8. A filter unit (100) having a compact air filter element (10) according to claim 7 and with cup-shaped housing element (20) open at one side, said housing element is configured to connect at said open side to said annular edge (14) or said sealing flange of said hood element (12) of said compact air filter element (10) and into which is insertable a part of said filter member (11) projecting from said hood element (12).

9. The filter unit according to claim 8, further comprising a plurality of clamping elements secured to and distributed about said circumference of said hood element.

10. The filter unit according to claim 9, wherein said hood element and said cup-shaped housing element are connected to one another by projections or recesses and snap hooks that are configured to lock therein.

* * * * *